United States Patent
Rollwage et al.

[11] Patent Number: 5,424,636
[45] Date of Patent: Jun. 13, 1995

[54] PROCESS AND DEVICE FOR DETECTING REVOLUTIONS OF A ROTATING ELEMENT BY TWICE FOURIER TRANSFORM

[75] Inventors: Mathias Rollwage, Ditzingen; Jochen Thoennissen; Michael Gobernatz, both of Stuttgart, all of Germany

[73] Assignee: Robert Bosch GmbH, Stuttgart, Germany

[21] Appl. No.: 70,425
[22] PCT Filed: Aug. 9, 1992
[86] PCT No.: PCT/DE92/00760
  § 371 Date: Jun. 4, 1993
  § 102(e) Date: Jun. 4, 1993
[87] PCT Pub. No.: WO93/07496
  PCT Pub. Date: Apr. 15, 1993

[30] Foreign Application Priority Data
  Oct. 8, 1991 [DE] Germany .......... 41 33 269.5

[51] Int. Cl.⁶ .......... G01P 3/46; G01P 3/42
[52] U.S. Cl. .......... 324/177; 324/160
[58] Field of Search .......... 324/177, 160, 163, 166, 324/168, 178; 318/600, 650

[56] References Cited
FOREIGN PATENT DOCUMENTS
0287852 10/1988 European Pat. Off.
2555317 5/1985 France.
2546795 4/1977 Germany.

Primary Examiner—Walter E. Snow
Attorney, Agent, or Firm—Michael J. Striker

[57] ABSTRACT

In a process and a device for measuring the rate of rotation of a rotating part which is completely enclosed by a housing, the current signal which is generated by the rotating part is subjected to two Fourier transforms after corresponding signal processing in digital form. The rate of rotation is determined from the spectrum obtained after the second Fourier transform. The rate of rotation is determined from the time pertaining to the maximum of the spectrum which is directly proportional to the rate of rotation.

13 Claims, 3 Drawing Sheets

PROCESS AND DEVICE FOR DETECTING REVOLUTIONS OF A ROTATING ELEMENT BY TWICE FOURIER TRANSFORM

BACKGROUND OF THE INVENTION

The present invention relates to a process and a device for detecting revolution of a rotating element, and in particular to such a process and device in which the rate of rotation of a rotating part enclosed by a housing is measured.

To determine the rate of rotation of rotating parts, markings which are generally arranged at the rotating part are sensed by an inductive transmitter or an optical sensor. When such marks pass by the stationary transmitter, voltage pulses are generated, the rate of rotation being calculated from the repetition rate of these voltage pulses.

It is not possible to calculate the rate of rotation in this way in the case of rotating parts which are completely enclosed by a housing. For example, in electric fuel pumps which are completely encapsulated, no rotatable parts are guided outward which would make it possible to determine the rate of rotation in a simple manner. For this reason, signals dependent on the rate of rotation have been analyzed in laboratory tests for determining the rate of rotation, e.g.: the oscillation acceleration on the electric fuel pump housing, fluctuations in pressure on the suction side or the pressure side, fluctuations in current in the electric supply lines, fluctuations in the magnetic field outside the electric fuel pumps which are caused by the rotating armature segments with the respective current-carrying alternations.

These signals were determined, for example, by separate sensors and processed in a subsequent evaluating arrangement. Determining the rate of rotation by measuring the intervals between individual oscillations has not proven reliable in the above-mentioned laboratory tests.

ADVANTAGES OF THE INVENTION

The process according to the invention with its characterizing features has the advantage over the prior art that a definite and precise measurement of the rate of rotation is made possible by determining a signal dependent on the rate of rotation and subsequently subjecting it twice to a Fourier transform.

It is particularly advantageous to use the current signal as an additional signal dependent on the rate of rotation in connection with a measurement of the rate of rotation of the electric fuel pump and to subject it to two fast Fourier transforms. The alternating supply of current to the armature windings during the rotation of the armature causes fluctuations in current. These current fluctuations, which occur with an exactly determined frequency which is dependent on the rate of rotation, are detected as maxima in the spectrum after a first Fourier transform; after an additional Fourier transform, the rate of rotation occurs as an absolute maximum and can be evaluated in a simple manner.

A plausibility check is made possible by comparing the rate of rotation determined from the spectrum obtained by a second Fourier transform, e.g. with the main components of the spectrum obtained after the first Fourier transform.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION A PREFERRED EMBODIMENT

Figure 1:
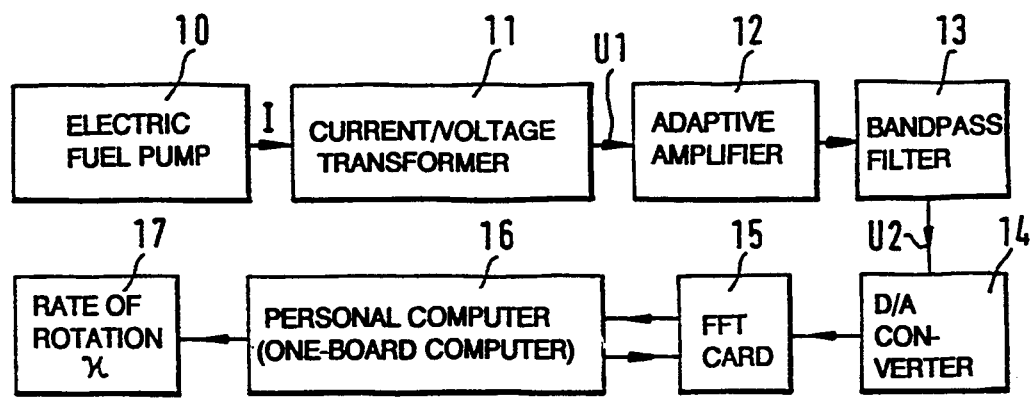
FIG. 1 is a view showing a device for detecting revolutions of a rotating element in accordance with the present invention.

FIG. 1 shows an embodiment example of the invention in the form of a block wiring diagram. The electric fuel pump whose rate of rotation is to be determined is designated by 10. A measuring device which measures the current signal or the magnetic fields of the electric fuel pump caused by the current signal is designated by 11, the measured current being transformed simultaneously into voltage U1.

An adaptive amplifier 12 (having a variable amplification factor adaptable to specific conditions) in which the voltage U1 is amplified is connected to the measuring device 11. The signal is filtered in a subsequent bandpass filter 13 so that a signal U2 is made available at the output of the bandpass filter for further evaluation. The signal U2 is plotted over time t in FIG. 2.

The signal U2 is digitized in the analog-to-digital converter 14. Fourier transforms run in a subsequent block 15 which can be a component of a computer 16; 15 can also be designated as a FFT card.

The measurements of the rate of rotation determined in the computer 16 are read out in an output unit designated by 17.

The electric fuel pump 10 whose rate of rotation is to be determined can be any electric pump, e.g. a roller cell pump, an internal gear pump, a peripheral pump or a side-channel pump. All of these types of pump are completely enclosed by a housing so that no rotatable part by which the rate of rotation could be determined relatively easily can be accessed or seen from the outside. Of course, the invention can be extended to all coupled motors.

The electric current fed to the electric fuel pump 10 which ultimately causes the armature of the electric fuel pump to rotate is to be evaluated according to the invention.

The alternating current supply to the armature windings of the pumps during rotation causes periodic fluctuations in current. These current fluctuations are dependent upon the rate of rotation and can be utilized for determining the rate of rotation of the electric fuel pump by measuring the so-called current shape picture I.

Figure 1A:
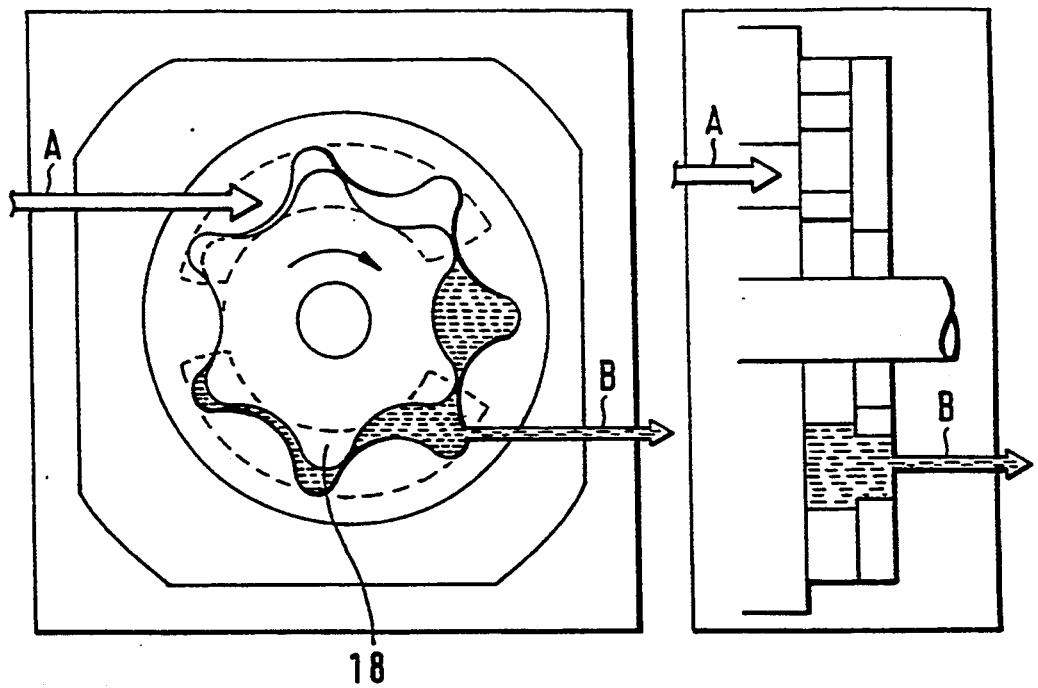
FIG. 1a shows an internal gear pump schematically.

In an electric fuel pump 10 shown in FIG. 1a, an internal gear pump with an inlet A and an outlet B with eight-slot armature 18, the first repetition follows after eight commutations.

The alternating frequency occurring in the current alternation as well as integral multiples of this alternating frequency and the frequency of the rate of rotation are present in the current shape picture I.

The current of the electric fuel pump is measured in the measuring device 11 in that the current is directed e.g. through a shunt resistor and the voltage U1 dropping across this resistor is tapped.

An improved measuring device 11 uses a current transformer which is based on the principle of compensation of magnetic fields and supplies a measurement current proportional to the primary current. This current is transformed via a precision metal-film resistor into a proportional voltage U1 which is subsequently evaluated.

Since the voltage U1 representing the input voltage of the adaptive amplifier 12 can fluctuate within a wide range, it is amplified in the adaptive amplifier 12 in such a way that an output voltage occurs within fixed limits at its output regardless of the level of input voltage. Moreover, the voltage U1 contains the same frequency components as the current picture I.

The bandpass filter 13 is a conventional bandpass filter which passes the frequency components to be studied and absorbs the rest of the frequency components.

The signal U2 is digitized in the analog-to-digital converter 14 so that a digital Fourier transform can be carried out subsequently.

The FFT card 15 is a device in which fast Fourier transforms (FFT=fast Fourier transform) are calculated. Such FFT's are known e.g. from J. W. Cooley and J. W. Tinkey: "An algorithm for the machine calculation of complex fourier series" in Math. of Comp., Vol. 19, No. 90, pp. 297–301, 1965.

The evaluation of the signals or spectra obtained after the Fourier transform or transforms is effected in a computer 16 which is e.g. a personal computer or a single-board computer.

Figure 2:
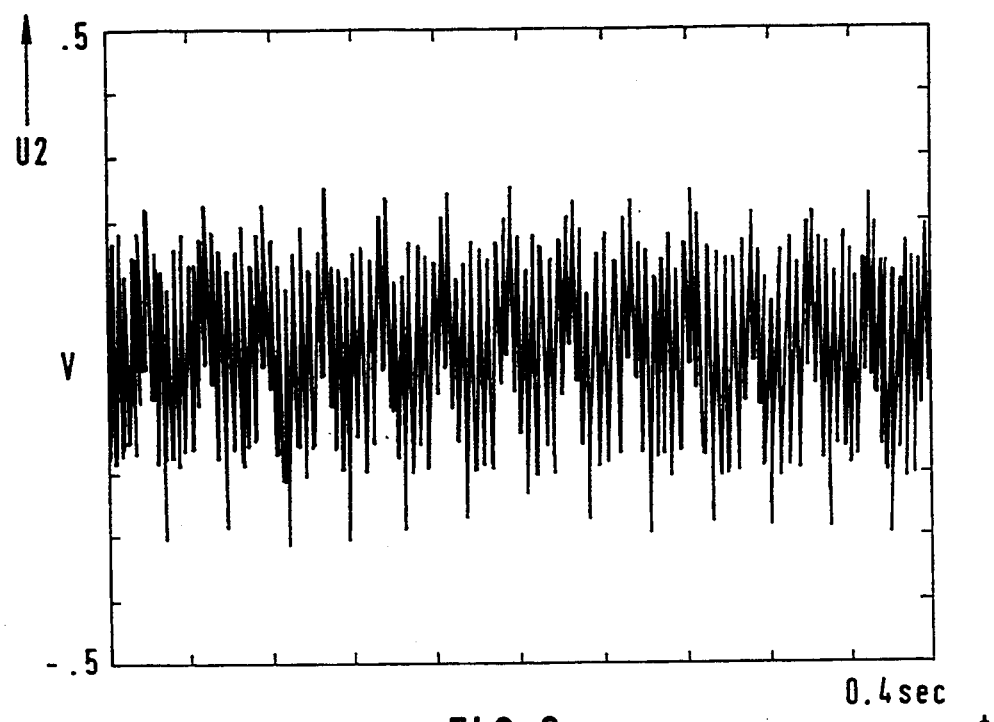
FIG. 2 shows the measured current curve over time subsequent to bandpass filtering.

When the signal U2(t) shown in FIG. 2, which is obtained from the current signal of the electric fuel pump after adaptive amplification and bandpass filtering, is subjected to a first Fourier transform, the spectrum U3 (f) occurs. This spectrum contains a plurality of relative maxima at frequencies corresponding to a multiple of the rate of rotation of the electric fuel pump. It would be possible to determine the rate of rotation from these maxima, but it has been shown that such a determination of the rate of rotation is destroyed by various effects. On the other hand, if the signal U3(f) is subjected a second time to a FFT in 15, a signal U4 (t) occurs which can be directly evaluated. In so doing, the periodicity of the spectrum harmonically generated by many revolutions is made use of. No incorrect measurements are made when individual harmonics are absent from the spectrum or the peak amplitudes fluctuate sharply from one spectrum to another.

Figure 4:
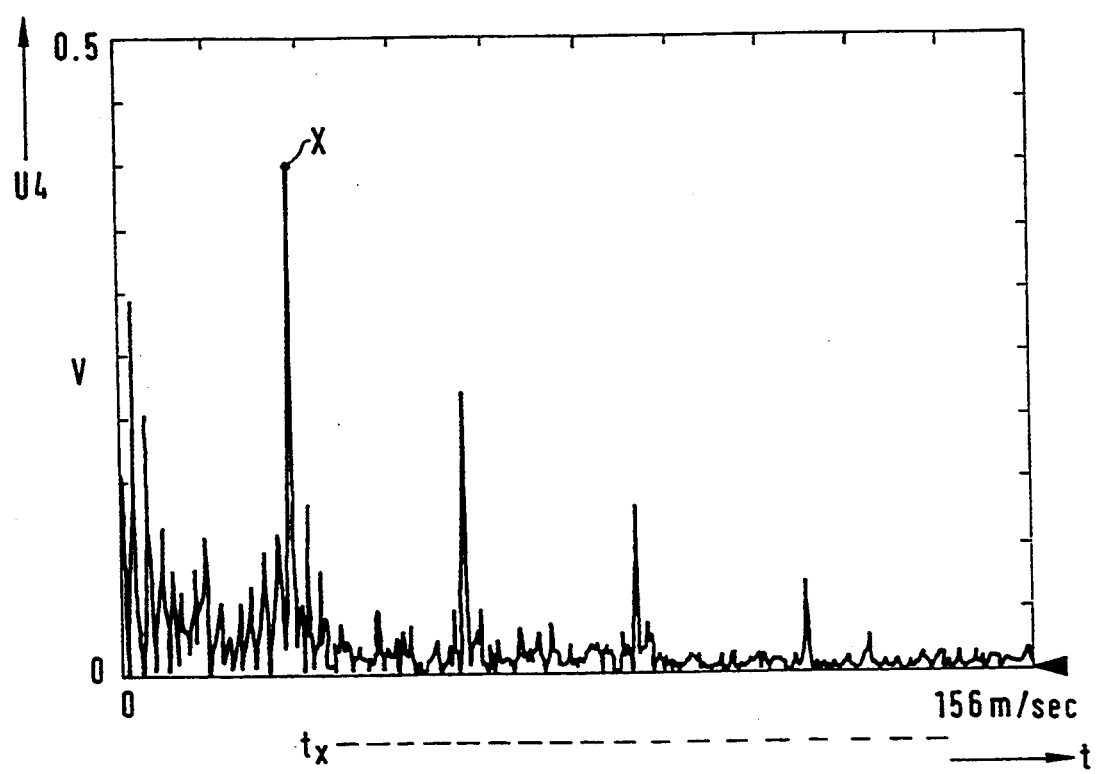
FIG. 4 shows the spectrum obtained after another Fourier transform over time.

In the spectrum U4 (t) shown in FIG. 4, the rate of rotation occurs as an absolute maximum x because the corresponding line interval is the clearest periodicity in the FFT spectrum. The position designated by x in FIG. 4 shows the maximum which is dependent on the rate of rotation; the respective time $t_x$ is determined and can be used, by way of observing the proportionality, for exactly determining the rate of rotation, since $n \sim 1/t$.

The low maxima contained in FIG. 4 denote times which correspond to twice, triple or quadruple the rate of rotation.

Figure 3:
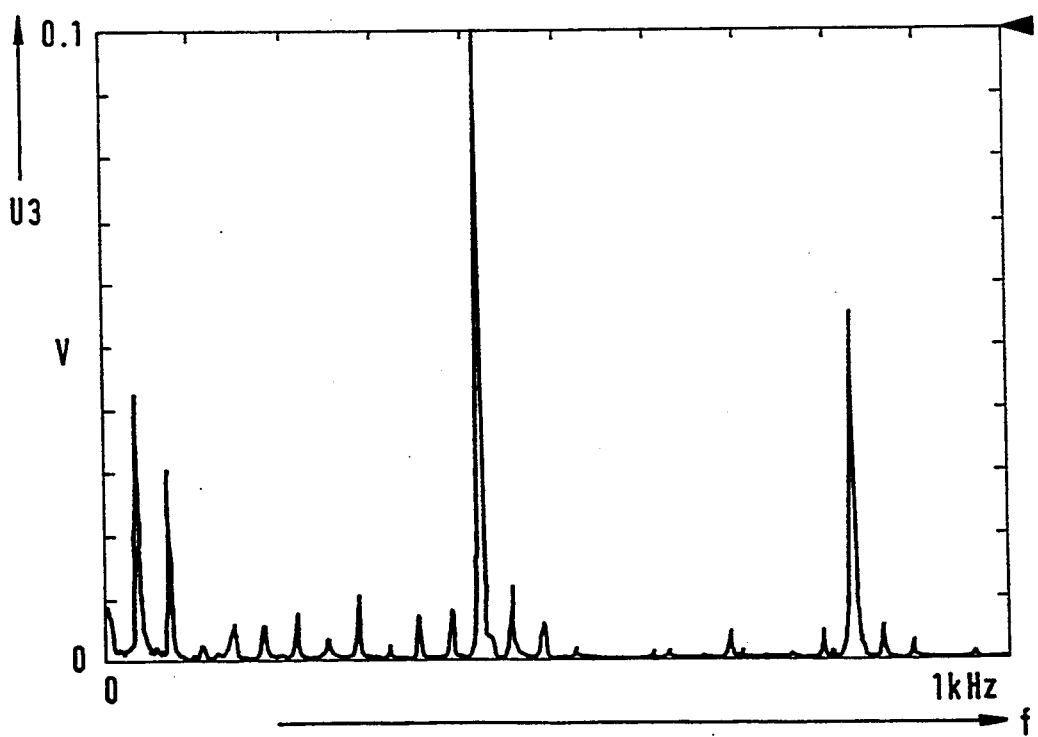
FIG. 3 shows the spectrum obtained after the first Fourier transform as a function of the frequency.

A comparison of the rate of rotation determined from the spectrum according to FIG. 4 with the values of the rate of rotation derivable from FIG. 3 enables a plausibility check to be effected in many ways by comparison with the main components of the FFT spectrum.

The accuracy of measurement of the described process depends on the data length of the calculations of the Fourier transforms. If exact measurement results are to be obtained, an increased expenditure on computing means is required when carrying out the Fourier transforms.

It will be understood that each of the elements described above, or two or more together, may also find a useful application in other types of processes and constructions differing from the types described above.

While the invention has been illustrated and described as embodied in a process and a device for measuring a rate of rotation of a rotating part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for measuring a rate of rotation of a rotating part which is enclosed by a housing, comprising the steps of determining a signal dependent on a rate of rotation of a rotating part; filtering and digitizing the signal and subjected the signal twice to a Fourier transform so as to form a spectrum; and determining a rate of rotation from the spectrum obtained by the preceding steps, by evaluating an absolute maximum of the spectrum.

2. A process as defined in claim 1, wherein said determining the rate of rotation includes determining the rate of rotation by evaluating a reciprocal value of times between maxima of the spectrum.

3. A process as defined in claim 1, wherein said determining a signal of the rotating part includes determining a signal of the rotating part formed as an armature of an electric fuel pump.

4. A process as defined in claim 3, wherein said signal is a current signal of the electric fuel pump.

5. A process as defined in claim 3, wherein said signal is a magnetic field signal of the electric fuel pump.

6. A process as defined in claim 1, wherein said subjection of the signal twice to a Fourier transform includes effecting the subjection in a microcomputer.

7. A process as defined in claim 1, wherein said evaluating includes an evaluating effected in a microcomputer.

8. A process as defined in claim 1, wherein said subjection to a Fourier transform and evaluating the absolute maximum are effected in a microcomputer.

9. A device for measuring a rate of rotation of a rotating part which is enclosed by a housing, comprising measuring means for determining a signal which is dependent on a rate of rotation of a rotating part to produce a signal; filtering means operative for filtering the signal; converting means for digitizing the filtered signal; a Fourier analyzer for carrying out twice a Fourier transform of the filtered and digitized signal so as to form a spectrum; and computer means for determining the rate of rotation from the spectrum obtained by the preceding steps, by evaluating an absolute maximum of the spectrum.

10. A device as defined in claim 9, wherein said filtering means is a bandpass filter; and further comprising an amplifier connecting said measuring means with said bandpass filter so that the signal is first amplified and then filtered in said bandpass filter.

11. A device as defined in claim 9, wherein said converting means is an analog-to-digital converter.

12. A device as defined in claim 10, wherein said amplifier is an adaptive amplifier.

13. A device as defined in claim 9, wherein said measuring means includes a current measuring device operating on the principle of compensation of magnetic fields and supplying at its output the signal which is a voltage corresponding to a measured current.

* * * * *